Nov. 30, 1965
W. D. HERCHER
3,221,138
PORTABLE CAR HEATER WITH TIME SWITCH
Filed April 15, 1963
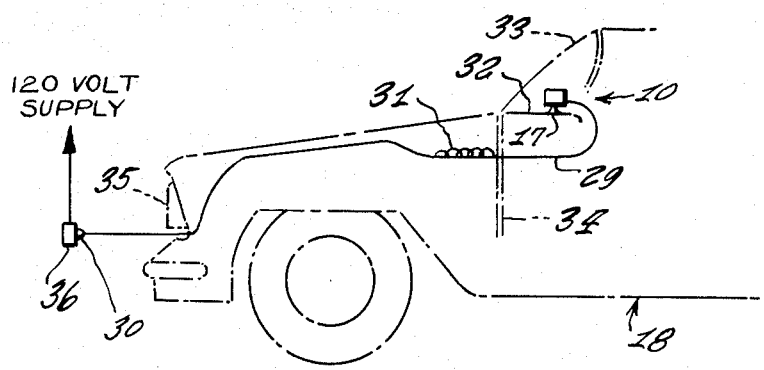
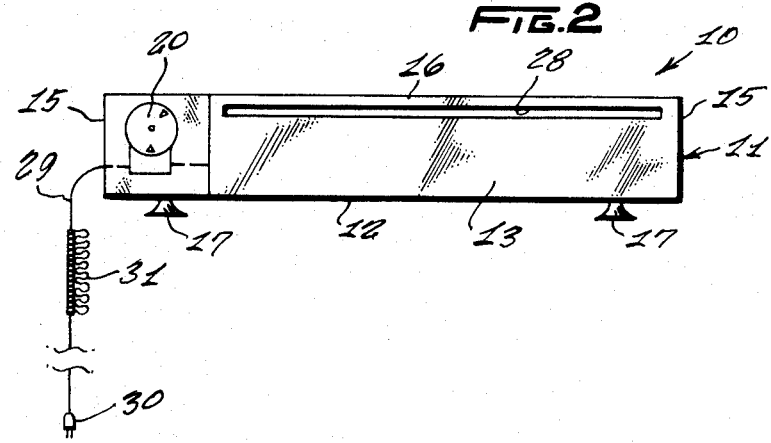
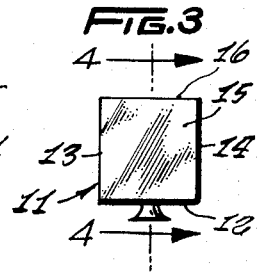
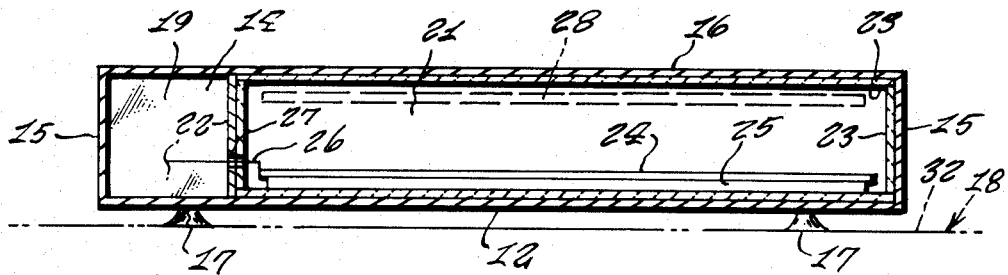
INVENTOR.
WILLIAM D. HERCHER

3,221,138
PORTABLE CAR HEATER WITH TIME SWITCH
William D. Hercher, 1811 Beech St., Pine Bluff, Ark.
Filed Apr. 15, 1963, Ser. No. 273,153
2 Claims. (Cl. 219—366)

This invention relates generally to automotive accessories. More specifically, it relates to portable heaters for automotive vehicles.

One object of the present invention is to provide a portable car heater for preheating an automotive vehicle prior to use. It is generally well known to those skilled in the art that on cold winter mornings, it is uncomfortable to get into a cold car and remain thus uncomfortable until the vehicle has generated sufficient heat within the interior which requires some time to accomplish.

Accordingly, it is another object of the present invention to provide a portable car heater having self-contained means for preheating a vehicle at a specific time prior to use and which can be set a considerable time prior thereto.

Still another object of the present invention is to provide a portable car heater with a time switch which serves an auxiliary purpose of defrosting a windshield.

Other objects of the invention are to provide a portable car heater with time switch bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side elevational view of the persent invention shown incorporated in a vehicle;

FIG. 2 is a front elevational view of the invention;

FIG. 3 is an end elevational view thereof; and

FIG. 4 is a cross sectional view taken along the lines 4—4 of FIG. 3 and looking in the direction of the arrows thereof.

Referring now to the drawing in detail, the numeral 10 represents a portable car heater with time switch according to the present invention wherein there is a housing 11 of generally longitudinal character and comprising a bottom panel 12, front panel 13, rear panel 14, end panels 15 and top panel 16. A pair of vacuum cups 17 are affixed to the underside of the bottom panel for purpose of attachment of the unit to an automotive vehicle 18. The housing encloses a central compartment 19 within which a 120 volt time switch 20 can be mounted. A separate compartment 21 is formed within the housing by means of a partition 22. This compartment is asbestos lined, as shown at 23. The lining is on all interior sides thereof. Within this compartment there is a 1,000 watt heater element 24 supported on a mounting 25 and which is connected by means of electrical wire 26 to the time switch, the wire passing through an opening 27 in the partition from one compartment to another. Near the upper edge of the front and rear panels there is a longitudinal slot 28 for purpose of allowing the heat to rise out of the compartment and into the vehicle being heated. An electric cord 29 having one end connected to the time switch extends out of the housing for the purpose of connecting to an outside electrical source. The opposite end of the cord has a plug 30 and there is a compression spring of special design 31 attached to the cord at its central portion for retracting the coil when not in use.

As shown in FIG. 1 of the drawing, the portable car heater may be mounted upon a dashboard 32 of the vehicle, in which position it can accomplish the additional service of serving as a windshield defroster for windshield 33. In this position the cord 29 extends under the dashboard through the fire wall 34 and forwardly to the front of the vehicle where the other end of the cord can extend outwardly through the grill 35.

In operative use, the device may be put to useful purpose as follows: On cold winter mornings, when the interior of the automotive vehicle is uncomfortably cold, the motorist will have taken the precaution on the previous evening on leaving the vehicle. At that time he will set the time switch for a certain hour. For example, if he wishes to leave the following morning at seven o'clock, he can set the time switch for six o'clock, whereby the unit will go on at six o'clock and supply heat to the interior of the vehicle until seven o'clock, at which time the motorist will arrive to find the vehicle comfortably warm. Upon leaving the vehicle after setting the time switch, the motorist will pull on the end of the cord between the grill causing the cord to stretch out in the area normally retracted by spring 31 and he will plug the end of the cord into a wall outlet 36 of a garage or house, thereby providing electrical supply to the unit.

Thus, there has been shown a portable car heater which can be preset and which will comfortably heat an automotive vehicle in cold weather.

While various changes may be made in the detail construction, it shall be understood that such change shall be within the spirit and scope of the present invention as defined by the appended claims.

What I claim as new and desire to protect by Letters Patent of the United States is:

1. In a portable car heater the combination of a housing, means within said housing for producing a quantity of heat and means within said housing for automatically placing said heating means into operation, said housing comprising a longitudinal unit, said unit having a bottom panel, a front panel, a rear panel, opposite end panels and a top panel, said panels enclosing two adjacent side-by-side compartments therewithin, said compartments being spaced apart by a vertical partition therebetween, said heating means comprising a longitudinal heating element operable by electrical power, said heating element being supported on bottom panel within one of said compartments in a horizontal plane, said automatic means for operating said heater element comprising a manually settable time switch, said time switch being mounted within the other of said compartments of said housing, said time switch being electrically connected to said heating element, said time switch having an outlet cord, one end of said outlet cord being electrically connected to said time switch and the other end of said outlet cord having a receptacle for being received in the electrical outlet of a house or garage, the interior of said compartment containing said heating element being asbestos lined on all sides, and said front panel and said rear panel each having a horizontal longitudinal open slot adjacent their upper edges communicating only with the compartment containing the heating element for admitting heat from said compartment containing said heating element outward into the interior of an automotive vehicle, said slots forming the sole communication between the interior and the exterior of the compartment containing the heating element.

2. In a portable car heater the combination as set forth in claim 1 wherein said housing includes a plurality of vacuum cups affixed to the underside of said bottom panel for selective attachment of said housing upon the dashboard of an automotive vehicle.

References Cited by the Examiner

UNITED STATES PATENTS

| | | | |
|---|---|---|---|
| 1,147,916 | 7/1915 | Bailey | 219—536 |
| 1,534,220 | 4/1925 | Kercher | 219—208 |
| 1,582,684 | 4/1926 | Hartwig | 219—368 |
| 1,658,384 | 2/1928 | Lynch | 219—526 |
| 1,934,565 | 11/1933 | Siers | 219—368 |
| 2,121,753 | 6/1938 | Cornell | 219—203 X |
| 2,535,424 | 12/1950 | Josephson | 219—368 |
| 2,819,373 | 1/1958 | Allman | 219—202 |
| 2,843,715 | 7/1958 | Paley | 219—365 |

RICHARD M. WOOD, *Primary Examiner.*

ANTHONY BARTIS, *Examiner.*